United States Patent
Nakata et al.

(10) Patent No.: US 8,800,624 B2
(45) Date of Patent: Aug. 12, 2014

(54) PNEUMATIC TIRE

(75) Inventors: Hiroshi Nakata, Kodaira (JP); Hideaki Minowa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 209 days.

(21) Appl. No.: 13/497,449

(22) PCT Filed: Sep. 24, 2010

(86) PCT No.: PCT/JP2010/005780
§ 371 (c)(1), (2), (4) Date: Mar. 21, 2012

(87) PCT Pub. No.: WO2011/036893
PCT Pub. Date: Mar. 31, 2011

(65) Prior Publication Data
US 2012/0216935 A1  Aug. 30, 2012

(30) Foreign Application Priority Data

Sep. 24, 2009 (JP) .................................. 2009-219680
Sep. 21, 2010 (JP) .................................. 2010-211028

(51) Int. Cl.
*B60C 9/18* (2006.01)
*B60C 9/22* (2006.01)

(52) U.S. Cl.
USPC ........... 152/532; 152/526; 152/531; 152/535; 152/537

(58) Field of Classification Search
None
See application file for complete search history.

(56) References Cited

U.S. PATENT DOCUMENTS

| 5,215,612 | A | * | 6/1993 | Motomura et al. | ......... 156/130.7 |
| 5,355,922 | A | * | 10/1994 | Kogure et al. | ............ 152/209.18 |
| 5,879,483 | A | * | 3/1999 | Gerresheim et al. | ....... 152/209.5 |
| 6,138,731 | A | | 10/2000 | Miyazaki et al. | |
| 7,441,576 | B2 | * | 10/2008 | Yamanaka | ..................... 152/527 |
| 7,712,500 | B2 | * | 5/2010 | Hayashi et al. | ................ 152/532 |
| 7,893,147 | B2 | * | 2/2011 | Otsuki | .......................... 524/493 |
| 2005/0000617 | A1 | | 1/2005 | Tsuruta | |

FOREIGN PATENT DOCUMENTS

| CN | 1809474 A | | 7/2006 |
| CN | 101528482 A | | 9/2009 |
| DE | 26 02 424 A1 | | 7/1977 |
| JP | GB 1067856 | * | 3/1974 |

(Continued)

OTHER PUBLICATIONS

Machine transation of JP 2000-177316, 2000.*

(Continued)

*Primary Examiner* — Justin Fischer
(74) *Attorney, Agent, or Firm* — Sughrue Mion, PLLC (57) ABSTRACT

A belt width of an intersecting belt 15a having the maximum belt width is set to 80% or more of the maximum width of a carcass line; a difference in belt widths between the intersecting belt 15a and an intersecting belt 15b is set in the range of 10 mm to 50 mm on one side of the belt in the width direction; the intersecting belt 15a is not narrower than the circumferential belt 14, and the circumferential belt 14 is not narrower than the intersecting belt 15b; and a pneumatic tire according to the present invention has an interposed rubber 16 having a thickness increasing toward the widthwise outer side of the tire to be 3 mm or more, and a side-lower rubber 17 having an elastic modulus less than the elastic modulus of a coating rubber coating the circumferential belt 14.

4 Claims, 3 Drawing Sheets

(56) References Cited

FOREIGN PATENT DOCUMENTS

| | | | |
|---|---|---|---|
| JP | 10-204214 A | | 8/1998 |
| JP | 2000-177316 | * | 6/2000 |
| JP | 2003-154808 A | | 5/2003 |
| JP | 2004-345437 A | | 12/2004 |
| JP | 2007-112394 A | | 5/2007 |
| JP | 2009-096856 A | | 5/2009 |
| WO | 2009/051097 A1 | | 4/2009 |
| WO | 2010/070887 A1 | | 6/2010 |

OTHER PUBLICATIONS

International Search Report of PCT/JP2010/005780 dated Nov. 9, 2010.
Extended European Search Report, dated May 10, 2013, issued in corresponding European Patent Application No. 10818570.3.
Chinese Office Action, dated Dec. 19, 2013, issued in corresponding Chinese Patent Application No. 201080051001.9.

* cited by examiner

PNEUMATIC TIRE

CROSS REFERENCE TO RELATED APPLICATIONS

This application is a National Stage of International Application No. PCT/JP2010/005780 filed Sep. 24, 2010, claiming priority based on Japanese Patent Application Nos. 2009-219680 filed Sep. 24, 2009 and 2010-211028 filed Sep. 21, 2010, the contents of all of which are incorporated herein by reference in their entirety.

TECHNICAL FIELD

The present invention relates to a pneumatic tire, and in particular, to a pneumatic radial tire for heavy loads employing a circumferential belt and favorably applied to trucks and buses.

RELATED ART

Conventionally, there have been known ultralow profile radial tires for trucks and buses (truck and bus radial tire: TBR) or other pneumatic radial tires for heavy load employing a circumferential belt located radially outward of the carcass of the tire and embedded in the tire along the tire circumferential direction in a layered manner.

In recent years, large-sized trucks and buses increasingly employ a single-tire mounting configuration to reduce the fuel consumption and the weight of the vehicle. With the increase in the large-sized trucks and buses having the single-tire mounting configuration, the profiles of the tires have become lower, and tread bases of the tires have become wider. In general, pneumatic tires having the lower profile are configured to have a belt formed by a pair of intersecting belts and a circumferential belt for circumferential reinforcement of the tire. This configuration enables maintaining the shape of the tire under a high inner pressure load, and improving the resistance to centrifugal force and the resistance to heat during the travel, thereby improving the durability of the tire.

As the pneumatic tire for heavy load applicable to trucks and buses having improved durability as described above, there are known a pneumatic radial tire (see Patent Document 1), a pneumatic tire (see Patent Document 2), and a pneumatic tire (see Patent Document 3), for example.

With the conventional ultralow-profile tire for heavy loads employing the circumferential belt, the circumferential belt enables maintaining the shape of the tire under the load, and providing the durability. However, the shear rigidity cannot be sufficiently obtained only with the circumferential belt, and hence, it is necessary to combine the circumferential belt with an intersecting belt to sufficiently obtain the shear rigidity. The intersecting belt has a high shear rigidity and easily stretches, while the circumferential belt has a low shear rigidity and is difficult to stretch. Thus, when the pneumatic tire is brought into contact with the road surface and receives load, the circumferential belt cannot follow the stretch of the intersecting belt, which leads to the breakage of belt cords forming the circumferential belt or detachment of the circumferential belt from the intersecting belt (separation).

For these reasons, countermeasures have been taken such that the belt width of the intersecting belt is narrowed to reduce the shear rigidity or the belt width of the circumferential belt is narrowed to suppress the occurrence of deformation of the belt, so that the circumferential belt can easily stretch.

RELATED ART DOCUMENT

Patent Document

Patent Document 1: Japanese Patent Application Laid-open No. 2003-154808
Patent Document 2: Japanese Patent Application Laid-open No. 2004-345437
Patent Document 3: Japanese Patent Application Laid-open No. 2007-112394

DISCLOSURE OF THE INVENTION

Problems to be Solved by the Invention

However, in the case where the belt width of the intersecting belt is narrowed, the shear rigidity cannot be sufficiently obtained, which causes the deterioration in the handling stability or advancement of uneven wear of the tire. In the case where the belt width of the circumferential belt is narrowed, the rigidity of the entire belt cannot be sufficiently obtained, causing problems similar to those described above.

In view of the above-described circumstances, in order to prevent the advancement of the uneven wear of the tire while avoiding the deterioration in the handling stability, the lack of rigidity, which the belt cannot cover, is made up for by disposing a rubber having increased elastic modulus in the vicinity of the belt (in other words, hardening the rubber). However, in general, if the rubber disposed around the belt is hardened, the energy loss of rubber increases, which leads to deterioration in durability against heat or deterioration in rolling resistance (RR).

An object of the present invention is to provide a pneumatic tire having a structure employing a circumferential belt, capable of eliminating the deterioration in the handling stability and the advancement of uneven wear of the tire without causing deterioration in the durability against heat or deterioration in the rolling resistance caused by hardening the rubber disposed in the vicinity of the belt.

Means for Solving the Problem

To achieve the above-described object, the present invention provides a pneumatic tire having a belt formed by a circumferential belt disposed radially inward and an intersecting belt layer of at least two intersecting belts disposed radially outward, the belts being layered radially outward of a carcass, wherein a belt width of the intersecting belt having the maximum belt width along the tire width direction among the intersecting belt layer is set to 80% or more of the maximum width of a carcass line, and a difference in belt widths between the intersecting belt having the maximum belt width and the intersecting belt having the second maximum belt width among the intersecting belt layer is set in the range of 10 mm to 50 mm on one side of the belt in the width direction. Further, the belt width has a relationship in which the intersecting belt having the maximum belt width is not narrower than the circumferential belt, and the circumferential belt is not narrower than the intersecting belt having the second maximum belt width; the pneumatic tire has an interposed rubber disposed between both end portions of the circumferential belt and respective end portions of the intersecting belt layer and having a thickness increasing toward the widthwise outer side of the tire to be 3 mm or more, the interposed rubber having a modulus of 100% elongation of 4 MPa or less and a loss tangent of 0.3 or less (room temperature, 2% strain, and 50 Hz); and the pneumatic tire has a side-lower rubber disposed at a side of and a lower portion of the end portion of the circumferential belt and having an elastic modulus not more than the elastic modulus of a coating rubber coating the circumferential belt.

According to another aspect of the pneumatic tire of the present invention, the radial growth ratio of the tire at the end portion of the circumferential belt is 0.3% or less at the time of inflating the tire with an inner pressure.

According to another aspect of the pneumatic tire of the present invention, the side-lower rubber has a modulus of 100% elongation of 4 MPa or less and a loss tangent of 0.3 or less (room temperature, 2% strain, 50 Hz).

According to another aspect of the pneumatic tire of the present invention, the circumferential belt is formed by a wavy belt or high elongation cord.

According to another aspect of the pneumatic tire of the present invention, a high-hardness rubber member is disposed between the circumferential belt and the side-lower rubber so as to be in contact with at least the circumferential belt, the high-hardness rubber member having an elastic modulus larger than the elastic modulus of a coating rubber coating the circumferential belt.

Effect of the Invention

According to the pneumatic tire of the present invention, a belt width of an intersecting belt having the maximum belt width along the tire width direction among intersecting belt layer is set to 80% or more of the maximum width of a carcass line; a difference in belt widths between the intersecting belt having the maximum belt width and an intersecting belt having the second maximum belt width among the intersecting belt layer is set in the range of 10 mm to 50 mm on one side of the belt in the width direction; the belt width has a relationship in which the intersecting belt having the maximum belt width is not narrower than the circumferential belt, and the circumferential belt is not narrower than the intersecting belt having the second maximum belt width; and the pneumatic tire has an interposed rubber disposed between both end portions of the circumferential belt and respective end portions of the intersecting belt layer and having a thickness increasing toward the widthwise outer side of the tire to be 3 mm or more, the interposed rubber having a modulus of 100% elongation of 4 MPa or less and a loss tangent of 0.3 or less (room temperature, 2% strain, and 50 Hz), and a side-lower rubber disposed at a side of and a lower portion of the end portion of the circumferential belt and having an elastic modulus not more than the elastic modulus of a coating rubber coating the circumferential belt. Thus, even if the structure of the tire employs the circumferential belt, it is possible to eliminate the deterioration in the handling stability and the advancement of the uneven wear without causing the deterioration in the durability against heat and the deterioration in rolling resistance resulting from hardening the rubber in the vicinity of the belt.

BRIEF DESCRIPTION OF THE DRAWINGS

FIG. 2(a) is a partial sectional view of Arrangement Example 1 along the width direction of the tire; FIG. 2(b) is a partial sectional view of Arrangement Example 2 along the width direction of the tire; and FIG. 2(c) is a partial sectional view of Arrangement Example 3 along the width direction of the tire.

BEST MODE FOR CARRYING OUT THE INVENTION

Hereinbelow, a mode for carrying out the present invention will be described with reference to the drawings.

Figure 1:
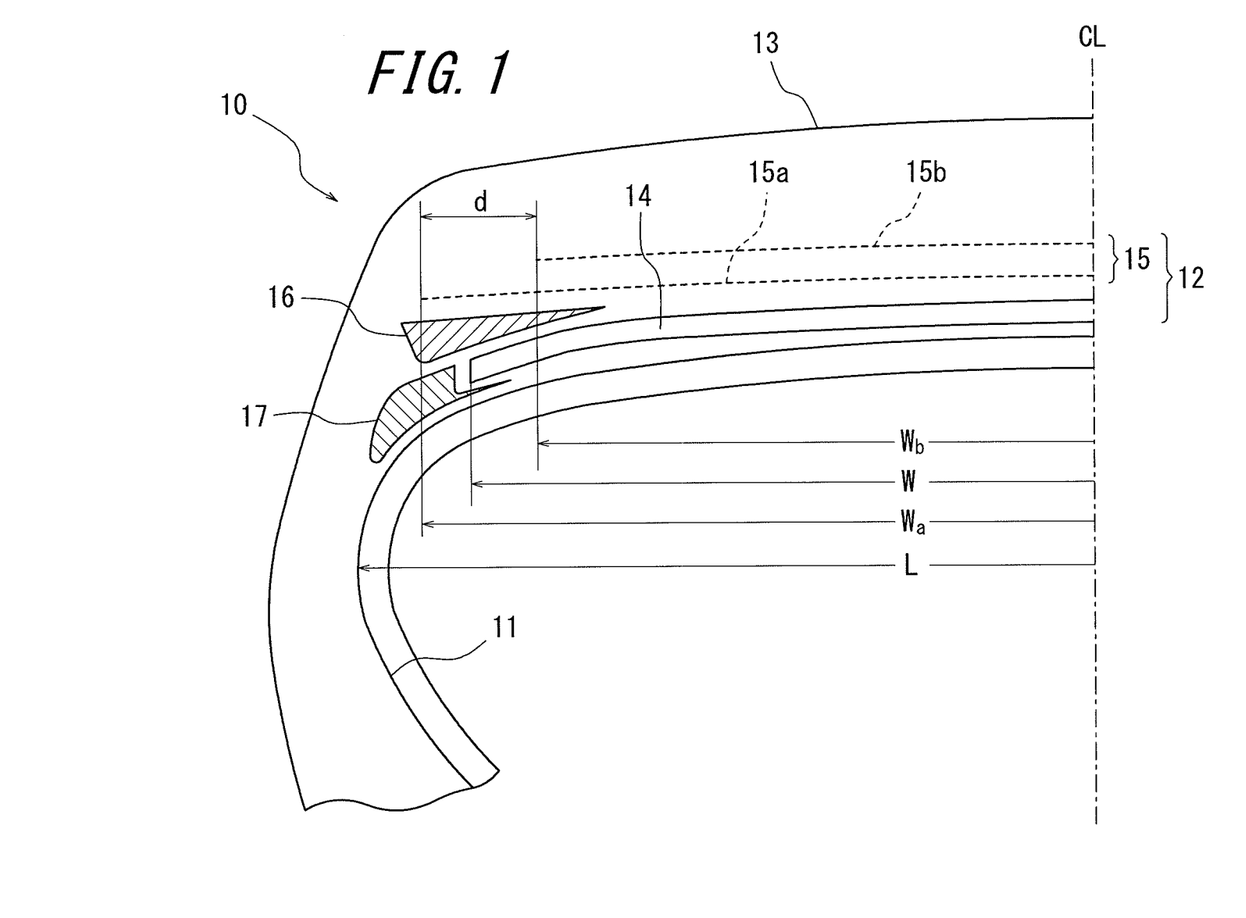
FIG. 1 is a widthwise sectional view schematically illustrating a configuration of a pneumatic tire according to an embodiment of the present invention.

FIG. 1 is a sectional view in a tire width direction schematically illustrating a configuration of a pneumatic tire according to an embodiment of the present invention. As illustrated in FIG. 1, a pneumatic tire 10 includes a carcass 11 forming a framework of a tire, a belt 12 disposed radially outward of the carcass 11 of the tire, and a tread portion 13 disposed radially outward of the belt 12 of the tire. The pneumatic tire 10 is, for example, an ultralow-profile radial tire for heavy load such as radial tire for trucks and buses (TBR). A side wall rubber forming a side wall portion of the tire is disposed widthwise outward of the carcass 11 continuing to the tread portion 13.

The carcass 11 toroidally extends between a pair of right and left bead cores (not illustrated) having a ring-shaped structure.

The belt 12 is formed by layering a circumferential belt 14 and an intersecting belt layer located radially outward of the circumferential belt 14 of the tire and having at least two intersecting belts 15 stacked in a layerd manner. The circumferential belt 14 and the intersecting belts 15 are formed by subjecting plural belt cords made, for example, of a steel fiber material or organic fiber material to a rolling process. It should be noted that two or more layers of the circumferential belts 14 may be laminated to form a circumferential belt layer.

It is desirable to form the circumferential belt 14 by orienting the fiber directions of the belt cords in substantially parallel to the tire circumferential direction, and employing a wavy belt or high elongation belt. The intersecting belts 15 are foamed by orienting the fiber directions of the belt cords at a predetermined belt angle with respect to the tire circumferential direction such that the intersecting belts 15 are laminated in a manner that the fiber directions of the belt cords are inclined in different directions from each other with respect to the tire circumferential direction.

It should be noted that the circumferential belt 14 may be formed, for example, by rubberizing plural cords arranged in parallel to obtain a ribbon-like strip having a width in the range of 3 mm to 20 mm, and spirally winding the ribbon-like strip around a tire axis in a manner that the cords extend at an angle 5° or less with respect to the circumferential direction of the tread. Further, as illustrated in FIG. 1, the circumferential belt 14 may be disposed along an outer peripheral surface of the carcass 11.

The plural intersecting belts 15 (two intersecting belts illustrated in this drawing as an example) have different widthwise lengths, in other words, different belt widths. A first intersecting belt 15a having the maximum belt width has a belt width of 80% or more of the maximum width L in the widthwise carcass line, and is desirable to have a flat shape.

A difference d (d=Wa−Wb) between the belt width (Wa) of the first intersecting belt 15a having the maximum belt width and a belt width (Wb) of a second intersecting belt 15b having the second maximum belt width falls in a range of 10 mm to 50 mm on one side in the tire width direction. The belt width (Wa) of the first intersecting belt 15a is not narrower than the belt width (W) of the circumferential belt 14, and the belt width (W) of the circumferential belt 14 is not narrower than the belt width (Wb) of the second intersecting belt 15b (Wb≤W≤Wa, see FIG. 1). More specifically, of the belts constituting the intersecting belt 15, the width of the widest belt (the first intersecting belt 15a in this specification) is wider than the belt width of the circumferential belt 14.

It should be noted that the radial growth of the tire at the belt end portion of the circumferential belt 14 is desirable to be a growth rate of 0.3% or less at the time of inflating the tire.

An interposed rubber 16 having a thickness (gauge: Ga.) increasing toward the outer side is disposed in a layered manner between both end portions of the circumferential belt 14 and respective end portions of the intersecting belt 15. The interposed rubber 16 has an elastic modulus less than or equal to that of a coating rubber (CR) coating the circumferential belt 14, in other words, has an elastic modulus less than that of the coating rubber CR, and is desirable to have an outer end portion with a thickness of 3 mm or more. Further, the interposed rubber 16 is desirable to have a modulus of 4 MPa or less at the time of 100% elongation, and a loss tangent (tan δ) of 0.3 or less (room temperature, 2% strain, 50 Hz).

A side-lower rubber 17 that may have, for example, a generally triangular shape is disposed at a side of and below the end portion of the circumferential belt 14. As illustrated in FIG. 1 as an example, the side-lower rubber 17 may be disposed widthwise outward of the widthwise outer end portion of the circumferential belt 14 and along the carcass 11 so as to be inclined radially inward.

In this specification, the "generally triangular shape" includes a triangular shape having a bent side and a triangular shape having a rounded corner, and is only necessary to have a triangular shape as a whole.

The side-lower rubber 17 has an elastic modulus not more than the elastic modulus of the coating rubber (CR) coating the circumferential belt 14, and is desirable to have a modulus (mod.) of 4 Mpa or less at the time of 100% elongation, and a loss tangent (tan δ) of 0.3 or less (room temperature, 2% strain, 50 Hz).

It should be noted that the interposed rubber 16 and the side-lower rubber 17 may be made of the same rubber material.

A high-hardness rubber member 18 is provided between the circumferential belt 14 and the side-lower rubber 17.

Figure 2:
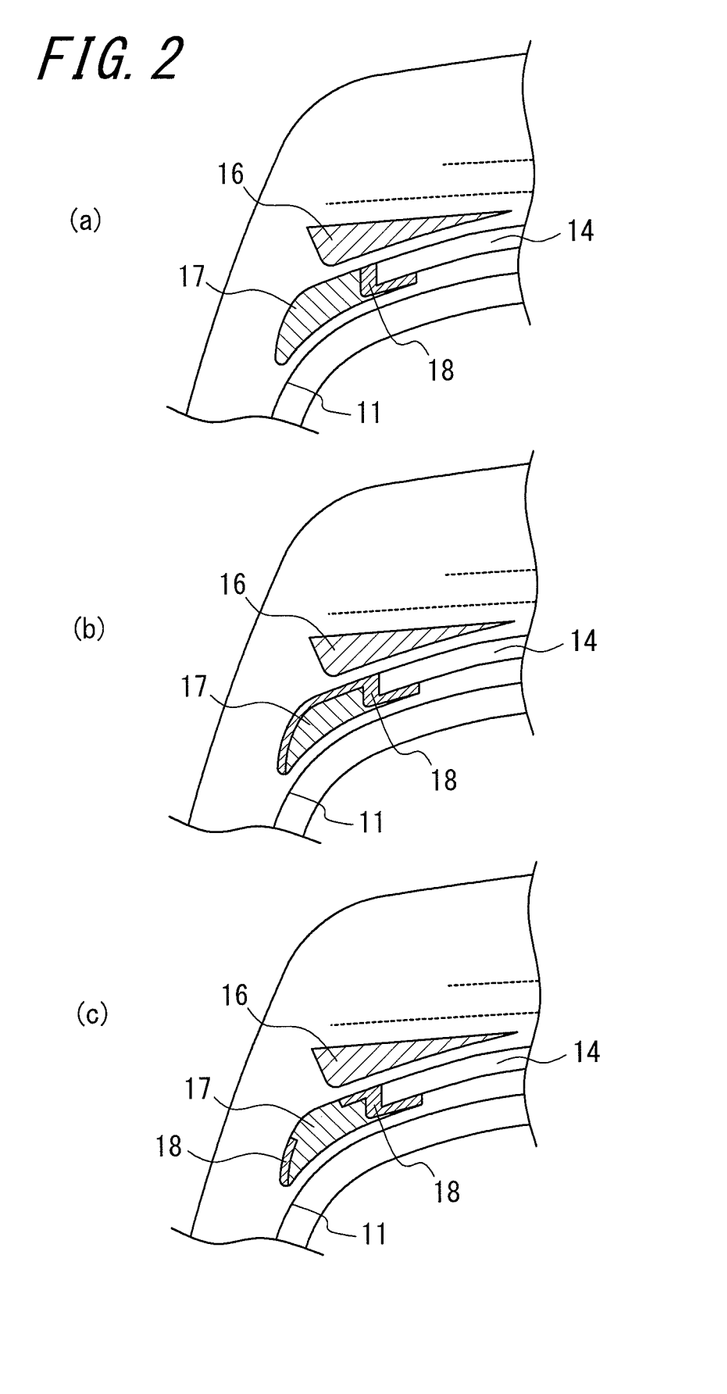
FIG. 2 are schematic views illustrating configurations of pneumatic tires illustrated in FIG. 1 and having a high-hardness rubber member.

FIG. 2 schematically illustrate configurations of the pneumatic tire illustrated in FIG. 1 each having a high-hardness rubber member. FIG. 2(a) is a partial sectional view of Arrangement Example 1 along the width direction of the tire, FIG. 2(b) is a partial sectional view of Arrangement Example 2 along the width direction of the tire, and FIG. 2(c) is a partial sectional view of Arrangement Example 3 along the width direction of the tire.

As illustrated in FIG. 2, the high-hardness rubber member 18 is disposed between the circumferential belt 14 and the side-lower rubber 17 so as to be in contact with at least the circumferential belt 14. The high-hardness rubber member 18 has an elastic modulus higher than that of a coating rubber coating the circumferential belt 14. In the widthwise cross section of the tire, the high-hardness rubber member 18 may be placed only at portions brought into contact with the circumferential belt 14 and the side-lower rubber 17 (see FIG. 2(a)); or, in addition to at the portions brought into contact with the circumferential belt 14 and the side-lower rubber 17, the high-hardness rubber member 18 may be placed so as to entirely cover the outer-peripheral area of the side-lower rubber 17 having a generally triangular shape (see FIG. 2(b)); or the high-hardness rubber member 18 may be placed so as to only cover both widthwise end portions of the side-lower rubber 17 on the outer-peripheral side of the side-lower rubber 17 (see FIG. 2(c)).

With the high-hardness rubber member 18, it is possible to avoid detachment of the coating rubber of the circumferential belt 14 and prevent the deterioration in the fatigue resistance of the circumferential belt cords. In other words, the high-hardness rubber member 18 existing between the circumferential belt 14 and the side-lower rubber 17 blocks the transportation of sulfur or cobalt contained in the coating rubber of the widthwise outer end portions of the circumferential belt 14 to the side-lower rubber 17 made of the low-loss rubber member having the smaller loss tangent. This makes it possible to prevent the deterioration in the adhesiveness of the coating rubber of the widthwise outer end portions of the circumferential belt 14 resulting from the reduction in the amount of, for example, sulfur or cobalt, so that the detachment of the coating rubber from the circumferential belt cords can be effectively prevented at the widthwise outer end portions of the circumferential belt 14.

The widthwise outer end portion of the circumferential belt 14 refers to an area extending from the outermost edge of the circumferential belt 14 to an intersecting point between the circumferential belt 14 and a line perpendicular to a tire central axis and passing through the center of a groove bottom of the shoulder circumferential groove located closest to the tread shoulder side of a tread road-contacting surface in the tread widthwise direction.

Further, the high-hardness rubber member 18 having the large elastic modulus can alleviate the pulling force and the compressive force applied to the cords of the widthwise outer end portions of the circumferential belt 14 and caused by the large elastic deformation of the side-lower rubber 17 made of the low-loss rubber member when the tire rotates with load. This makes it possible to effectively prevent the detachment of the coating rubber of the circumferential belt 14 and the deterioration in the fatigue resistance of the circumferential belt cords, while improving the fuel efficiency of the tire by employing a rubber having the low-loss tangent as the side-lower rubber 17 made of the low-loss rubber member to reduce the rolling resistance.

In this specification, the loss tangent is measured with a viscoelasticity tester under predetermined frequency (for example, 50 Hz), strain (for example, 2%) and temperature conditions (for example, room temperature), and the elastic modulus means 100% modulus calculated by measuring dynamic stress at the time when dynamic strain is applied in accordance with JIS K6251, in other words, under predetermined temperature (for example, 25° C.), frequency, and strain conditions.

It should be noted that, in the case where the side-lower rubber 17 is placed so as to slightly enter the widthwise outer end portion of the circumferential belt 14 toward the radially inner side of the widthwise outer end portion of the circumferential belt 14 as illustrated in FIGS. 2(a) to 2(c), the high-hardness rubber member 18 having the large elastic modulus is employed for a rubber member disposed at the entry portion, which is a part of the side-lower rubber 17 brought into contact with the widthwise outer end portion of the circumferential belt 14.

Further, the high-hardness rubber member 18 is disposed over the entire outer peripheral area of the side-lower rubber 17 so as to cover the side-lower rubber 17 (see FIG. 2(b)), and is layered with the side-lower rubber 17. This layered structure is formed by integrally extruding two types of rubber materials including the low-loss rubber member and the high-hardness rubber member with one extruder. In this case, this layered structure effectively functions. In other words, regardless of the accuracy of the extrusion of the rubber materials, the manufactured tire has the high-hardness rubber member 18 reliably placed at the contacting area of the side-lower rubber 17 brought into contact with the widthwise outer end portion of the circumferential belt 14, so that the effect of preventing the detachment of the coating rubber of the circumferential belt 14 and the deterioration in the fatigue resistance of the circumferential belt cord can be further enhanced.

As described above, the pneumatic tire 10 includes the intersecting belt 15 having the belt width of 80% or more of the maximum width L of the carcass line to avoid the deterioration in the handling stability and the advancement of the uneven wear of the tire. The circumferential belt 14 also has increased belt width. In this case, the circumferential belt 14 may be stretched and the cords thereof may be broken as a result of stretch of the intersecting belt 15. To prevent the breakage, it is effective to reduce the initial stretch of the circumferential belt 14 occurring at the time of inflating the tire with an internal pressure. Further, the strain of the belt end portion itself of the circumferential belt 14 can be reduced by reducing the growth ratio at the belt end portion of the circumferential belt 14 in the radial direction of the tire to 0.3% or less at the time of inflating the tire with an internal pressure.

The first intersecting belt 15a is not narrower than the circumferential belt 14, and the circumferential belt 14 is not narrower than the second intersecting belt 15b. This is because, in the case where the belt width of the circumferential belt 14 exceeds the belt width of the first intersecting belt 15a having the widest belt, the core of the breakage transfers to the intersecting belt 15, which causes the deterioration in the durability. Further, in the case where the belt width of the circumferential belt 14 is narrower than that of the second intersecting belt 15b, the input from the intersecting belt 15 to the circumferential belt 14 increases, which leads to breakage of the cords forming the circumferential belt 14 or detachment of the circumferential belt 14 from the intersecting belt 15 (separation). Additionally, it is preferable to sufficiently increase the thickness (gauge: Ga.) of the belt end portion of the circumferential belt 14, where the input is particularly large, to alleviate the input from the circumferential belt 14.

By employing the configurations described above, the durability of the tire can be improved. Further, by widening the belt width of the intersecting belt 15 from the conventional technique, it is possible to obtain the sufficient shear rigidity. These eliminate the need to increase the elastic modulus of the rubber arranged around the belt in order to compensate the lack of rigidity. Thus, the elastic modulus of the rubber arranged around the belt can be set lower, and the rubber arranged around the belt can absorb the belt strain, so that the occurrence of the strain at the belt end portion, which is highly likely to break, can be further reduced. Similarly, by reducing the hysteresis loss of the rubber arranged around the belt, the durability against heat can be improved, and further, the rolling resistance can be reduced.

EXAMPLE

Two types (Examples 1 and 2) of pneumatic tires 10 according to the present invention were prepared, and were subjected to comparative tests with two types of Conventional Examples (Conventional Examples 1 and 2) and Comparative Example in terms of modulus (mod.) of 100% elongation and loss tangent (tan δ) of the interposed rubber 16 and the side-lower rubber 17.

Figure 3:
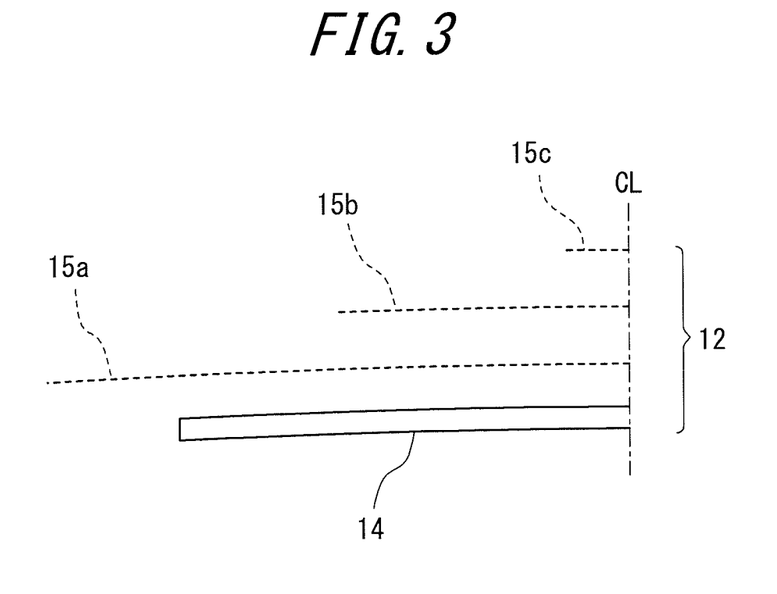
FIG. 3 is a diagram for schematically explaining a belt structure of prepared pneumatic tires.

FIG. 3 is a diagram for conceptually explaining a belt structure of the prepared pneumatic tires. As illustrated in FIG. 3, the prepared pneumatic tires were ultralow profile radial tires for heavy load with a tire size of 495/45R225, and include an intersecting belt layer with three-layered structure (first intersecting belt 15a, second intersecting belt 15b, and third intersecting belt 15c: Example 1) or two-layered structure (first intersecting belt 15a, and second intersecting belt 15b: Example 2), and the circumferential belt 14 employing a wavy belt.

Next, characteristics of Conventional Examples 1 and 2, Comparative Example 1, and Examples 1 and 2 will be described (see Table 1).

Belt width of the third intersecting belt 15c:

200 mm for Example 2 (only Example 2 has the third intersecting belt 15c).

Belt width of the second intersecting belt 15b:

220 mm for Conventional Example 1, 390 mm for Conventional Example 2, and 400 mm for Comparative Example and Examples 1 and 2.

Belt width of the first intersecting belt 15a:

420 mm for Conventional Example 1, 430 mm for Conventional Example 2, 440 mm for Comparative Example and Example 1, and 450 mm for Example 2.

Belt width of the circumferential belt 14:

370 mm for Conventional Example 1, 350 mm for Conventional Example 2, 420 mm for Comparative Example and Example 1, and 430 mm for Example 2.

Width of the carcass in the tire width direction:

494 mm for Conventional Examples 1 and 2, Comparative Example, and Examples 1 and 2.

Modulus (mod.) of 100% elongation of the side-lower rubber 17:

6.5 MPa for Conventional Examples 1 and 2 and Comparative Example, 2.2 MPa for Example 1, and 3.0 MPa for Example 2.

Loss tangent (tan δ) of the side-lower rubber 17:

0.25 for Conventional Examples 1 and 2, and Comparative Example, 0.09 for Example 1, and 0.12 for Example 2.

Gauge (Ga.) between the circumferential belt 14 and the intersecting belt 15:

1.5 mm for Conventional Example 1, 1.2 mm for Conventional Example 2, 1.5 mm for Comparative Example, and 4 mm for Examples 1 and 2.

Modulus (mod.) of 100% elongation of the interposed rubber 16:

6.5 MPa for Conventional Examples 1 and 2 and Comparative Example, 2.2 MPa for Example 1, and 2.0 MPa for Example 2.

Loss tangent (tan δ) of the interposed rubber 16:

0.25 for Conventional Examples 1 and 2 and Comparative Example, and 0.09 for Examples 1 and 2.

TABLE 1

| Belt | Conventional Example 1 | Conventional Example 2 | Comparative Example 1 | Example 1 | Example 2 |
|---|---|---|---|---|---|
| Width of third intersecting belt (mm) | — | — | — | — | 200 |
| Width of second intersecting belt (mm) | 220 | 390 | 400 | 400 | 400 |
| Width of first intersecting belt (mm) | 420 | 430 | 440 | 440 | 450 |
| Width of circumferential belt (mm) | 370 | 350 | 420 | 420 | 430 |
| Width of carcass (mm) | 494 | 494 | 494 | 494 | 494 |
| Side-lower rubber mod. (MPa) | 6.5 | 6.5 | 6.5 | 2.2 | 3.0 |
| Side-lower rubber tan δ | 0.25 | 0.25 | 0.25 | 0.09 | 0.12 |
| Gauge between layers (Ga.) (mm) | 1.5 | 1.2 | 1.5 | 4 | 4 |
| Interposed rubber mod. (MPa) | 6.5 | 6.5 | 6.5 | 2.2 | 2.0 |
| Interposed rubber tan δ | 0.25 | 0.25 | 0.25 | 0.09 | 0.09 |

More specifically, in Conventional Example 1, a difference in belt widths between the first intersecting belt 15a and the second intersecting belt 15b is 200 mm; in Conventional Example 2, the second intersecting belt 15b is set wider than the circumferential belt 14; and in Comparative Example, the mod. of the side-lower rubber 17 and the mod. of elongation of the interposed rubber 16 exceed 4 MPa.

The prepared tires with the above-described size were mounted on an applicable rim with 17.00-inch width and inflated at an inner pressure of 900 kPa. The prepared tires were evaluated in terms of durability, handling stability, uneven wear resistance, and rolling resistance (see Table 2).

Durability:

The tires were traveled for 100,000 km on a drum at a rate of 80 km/h under a load of 8500 kg. Evaluation was made on temperatures of the tires during the travel, the number of broken cords of the circumferential belt after the travel, and the detachment of the belt after the travel (belt separation).

Handling Stability:

The tires were mounted on a drive shaft of a tractor head. Evaluation was made on feelings obtained through slalom travel in a state that the tractor head pulls a trailer with a constant load.

Uneven Wear Resistance:

The tires were mounted on a drive shaft of a tractor head. Evaluation was made on the amount of uneven wear (uneven wear vol.) at the shoulder end after travel for 50,000 km in a state where the tractor head pulls a trailer without load.

Rolling Resistance:

The tires were traveled on a drum at a rate of 80 km/h with load of 5,800 kg. Evaluation was made in terms of rolling resistance.

In this specification, the term "applicable rim" refers to the "applicable rim" specified by the Japan Automobile Tyre Manufacturers Association, Inc. (JATMA), or the "design rim" specified by the Tire and Rim Association Inc. (TRA), or the "measuring rim" specified by the European Tyre and Rim Technical Organization (ETRTO). The term "regular internal pressure" refers to the "maximum pneumatic pressure" defined by JATMA, or the maximum value of the "tire load limits at various cold inflation pressures" specified by TRA, or the "inflation pressures" specified by ETRTO. The term "regular load" refers to the "maximum load capacity" specified by JATMA, or the maximum value of "tire load limits at various cold inflation pressures" specified by TRA, or the "load capacity" specified by ETRTO.

TABLE 2

| Sample tire | Difference in temperatures during travel relative to Cont (the smaller value represents the better performance) | Index of the number of broken cord (the smaller value represents the better performance) | Index of length of detachment of belts (the smaller value represents the better performance) | Index of feeling (the greater value represents the better performance) | Index of the amount of uneven wear (the smaller value represents the better performance) | Index of rolling resistance (the smaller value represents the better performance) |
|---|---|---|---|---|---|---|
| Conventional Example 1 | Cont | 100 (Cont) | 100 (Cont) | 100 (Cont) | 100 (Cont) | 100 (Cont) |
| Conventional Example 2 | 0 | 131 | 143 | 120 | 93 | 100 |
| Comparative Example | −0.2 | 21 | 54 | 145 | 46 | 99 |
| Example 1 | −5.7 | 0 | 24 | 135 | 38 | 95 |
| Example 2 | −5.2 | 0 | 24 | 140 | 38 | 96 |

From the results of comparison with Conventional Examples in each of the evaluation items, the following evaluation results can be obtained.

Difference in temperatures during the travel relative to Cont (the smaller value represents the better performance):

As compared with Conventional Examples 1 and 2, temperature of Comparative Example is 0.2° C. lower (−0.2), temperature of Example 1 is 5.7° C. lower (−5.7), and temperature of Example 2 is 5.2° C. lower (−5.2), each of which exhibits sufficient temperature differences.

Index of the number of broken cords (the smaller value represents the better performance):

With Conventional Example 1 being set to 100, the value of Conventional Example 2 is 131, the value of Comparative Example is 21, and the value of Example 1 and Example 2 is 0, namely, there was no broken cords in Examples 1 and 2.

Index of length of detachment of belts (the smaller value represents the better performance):

With Conventional Example 1 being set to 100, the value of Conventional Example 2 is 143, and the value of Comparative Example is 54. On the other hand, Example 1 and Example 2 largely reduce the detachment of belts and the value thereof is 24, which is approximately ¼ to ⅙ of Conventional Example, and approximately ½ of Comparative Example.

Feeling index (the greater value represents the better performance):

With Conventional Example 1 being set to 100, the value of Conventional Example 2 is 120, and the value of Comparative Example is 145. On the other hand, the value of Example 1 is 135, and the value of Example 2 is 140, which improves with approximately 10 to 40% increase as compared with Conventional Example.

Index of the amount of uneven wear (the smaller value represents the better performance):

With Conventional Example 1 being set to 100, the value of Conventional Example 2 is 93, and the value of Comparative Example is 46. On the other hand, the value of Example 1 and Example 2 is 38, which is approximately 60% decrease as compared with Conventional Example, largely reducing the amount of uneven wear as compared with Conventional Example.

Rolling resistance (the smaller value represents the better performance):

With Conventional Example 1 and Conventional Example 2 being set to 100, the value of Comparative Example is 99. On the other hand, the value of Example 1 is 95, and the value of Example 2 is 96, which is approximately 4 to 5% of Conventional Example, reliably improving the rolling resistance.

As described above, in the pneumatic tire 10, the shear rigidity is increased to obtain the belt rigidity without hardening the circumferential belt 14, so that the belt durability can be increased. Further, the first intersecting belt 15a is not narrower than the circumferential belt 14, and the circumferential belt 14 is not narrower than the second intersecting belt 15b (see FIG. 3), so that the intersecting belt 15 has increased shear rigidity to sufficiently obtain the belt rigidity. Yet further, the rubber having the elastic modulus smaller than that of the coating rubber (CR) coating the circumferential belt 14 is employed as a rubber in the vicinity of the circumferential belt 14, and the interposed rubber 16 and the side-lower rubber 17 are disposed at the belt end portions of the circumferential belt 14, so that the durability against heat can be improved and the rolling resistance can be reduced.

INDUSTRIAL APPLICABILITY

According to the present invention, even if the tire employs the structure having the circumferential belt, it is possible to eliminate the deterioration in the handling stability and the advancement of the uneven wear without causing the deterioration in the durability against heat and the deterioration in rolling resistance resulting from hardening the rubber in the vicinity of the belt. Thus, the present invention is suitably used in a pneumatic tire, in particular, in a pneumatic radial tire for heavy load employing the circumferential belt and preferably applied to trucks or buses.

The present application claims priority based on Japanese Patent Application No. 2009-219680 filed in Japan on Sep. 24, 2009 and Japanese Patent Application No. 2010-211028 filed in Japan on Sep. 21, 2010, all of which disclosure is incorporated herein by reference.

EXPLANATION OF REFERENCE CHARACTERS

10 Pneumatic tire
11 Carcass
12 Belt
13 Tread portion
14 Circumferential belt
15 Intersecting belt
15a First intersecting belt
15b Second intersecting belt
15c Third intersecting belt
16 Interposed rubber
17 Side-lower rubber
18 High-hardness rubber member
L Widest carcass line
W, Wa, Wb Belt width
d Difference in belt width

The invention claimed is:

1. A pneumatic tire having a belt formed by a circumferential belt disposed radially inward and an intersecting belt layer of at least two intersecting belts disposed radially outward, said belts being layered radially outward of a carcass, wherein
  a belt width of the intersecting belt having the maximum belt width along the tire width direction among the intersecting belt layer is set to 80% or more of the maximum width of a carcass line,
  a difference in belt widths between the intersecting belt having the maximum belt width and the intersecting belt having the second maximum belt width among the intersecting belt layer is set in the range of 10 mm to 50 mm on one side of the belt in the width direction,
  the belt width has a relationship in which the intersecting belt having the maximum belt width is not narrower than the circumferential belt, and the circumferential belt is not narrower than the intersecting belt having the second maximum belt width,
  the pneumatic tire has an interposed rubber disposed between both end portions of the circumferential belt and respective end portions of the intersecting belt layer and having a thickness increasing toward the widthwise outer side of the tire to be 3 mm or more, said interposed rubber having a modulus of 100% elongation of 4 MPa or less and a loss tangent of 0.3 or less (room temperature, 2% strain, and 50 Hz), and
  the pneumatic tire has a side-lower rubber disposed at a side of and a lower portion of the end portion of the circumferential belt and having an elastic modulus not more than the elastic modulus of a coating rubber coating the circumferential belt,
  wherein a high-hardness rubber member is disposed between the circumferential belt and the side-lower rubber so as to be in contact with at least the circumferential belt, said high-hardness rubber member having an elastic modulus larger than the elastic modulus of a coating rubber coating the circumferential belt.

2. The pneumatic tire according to claim 1, wherein
  the radial growth ratio of the tire at the end portion of the circumferential belt is 0.3% or less at the time of inflating the tire with an inner pressure.

3. The pneumatic tire according to claim 1, wherein
  the side-lower rubber has a modulus of 100% elongation of 4 MPa or less and a loss tangent of 0.3 or less (room temperature, 2% strain, 50 Hz).

4. The pneumatic tire according to claim 1, wherein the circumferential belt is formed by a wavy belt or high elongation cord.

* * * * *